United States Patent [19]
Uke

[11] Patent Number: 5,676,476
[45] Date of Patent: Oct. 14, 1997

[54] METHOD AND APPARATUS FOR PREVENTING INJURY TO AN ELECTRONIC COMPUTER KEYBOARD OPERATOR

[76] Inventor: Alan K. Uke, 355-14th St., Del Mar, Calif. 92014

[21] Appl. No.: 572,091

[22] Filed: Dec. 14, 1995

[51] Int. Cl.$^6$ .................................................. B41J 5/26
[52] U.S. Cl. ........................................ 400/472; 400/489
[58] Field of Search ................................ 400/472, 489, 400/482, 487, 488, 485, 484; 341/21, 22, 23; 345/168, 169

[56] References Cited

U.S. PATENT DOCUMENTS

| | | | |
|---|---|---|---|
| 3,480,744 | 11/1969 | Yamada | 200/18 |
| 3,805,939 | 4/1974 | Ross | 197/19 |
| 4,247,208 | 1/1981 | Fulkerson et al. | 400/194 |
| 4,381,691 | 5/1983 | Conklin et al. | 84/440 |
| 4,791,257 | 12/1988 | Frey et al. | 200/159 |
| 5,119,078 | 6/1992 | Grant | 340/711 |
| 5,129,747 | 7/1992 | Hutchison | 400/489 |
| 5,131,614 | 7/1992 | Garcia et al. | 248/118 |
| 5,228,791 | 7/1993 | Fort | 400/489 |
| 5,278,779 | 1/1994 | Conway | 364/708.1 |
| 5,352,050 | 10/1994 | Choate | 400/486 |
| 5,391,006 | 2/1995 | Danziger | 400/488 |
| 5,405,204 | 4/1995 | Ambrose | 400/472 |
| 5,421,543 | 6/1995 | Rossman | 248/118.3 |
| 5,434,566 | 7/1995 | Iwasa et al. | 341/34 |
| 5,445,349 | 8/1995 | Hart | 248/118 |

*Primary Examiner*—Edgar S. Burr
*Assistant Examiner*—Anthony H. Nguyen
*Attorney, Agent, or Firm*—Baker, Maxham, Jester & Meador

[57] ABSTRACT

The keystroke resistance and keystroke length of an electronic QWERTY style keyboard for personal computers and other electronic devices are increased to at least one hundred grams and ten millimeters, respectively, to reduce the incidence of carpal tunnel syndrome and other injuries associated with repetitive movements in long term keyboard operation.

1 Claim, 1 Drawing Sheet

METHOD AND APPARATUS FOR PREVENTING INJURY TO AN ELECTRONIC COMPUTER KEYBOARD OPERATOR

BACKGROUND OF THE INVENTION

The present invention relates generally to electronic keyboards for computers, electric typewriters and similar manual data input devices utilizing the standard QWERTY key format, and more particularly, to a method, and ergonomic design for an electronic keyboard for preventing injury to the forearms, wrists and hands of an operator.

Conventional electronic keyboards for computers, typewriters, or similar machines typically have a set of keys all aligned substantially in a single plane that may be flat or slightly tilted toward the operator. Electronic adding machines normally have a keypad with ten keys arranged with three keys per row. Therefore, they do not require the operator to pivot his or her wrist from side-to-side. The standard QWERTY key format used by the majority of computer operators throughout the world has three rows of at least ten keys in standard positions and arranges the alphabetic keys in parallel rows and parallel columns. The alphabetic keys include the twenty-six letter keys and typically four punctuation keys. In addition to the alphabetic keys, conventional keyboards also have numeric and/or function keys which are typically located above, below, or on one or both sides of the alphabetic keys. The function keys typically include, for example, the tab, shift, and return keys as well as the alt, control, and option keys. During the typing operation, the operator's forearms are positioned at inwardly directed angles from the operator's sides toward the keyboard, with the palms down and the hands generally flat. The wrists are bent and the hands are angled outwardly relative to the forearms in order to align the operator's fingers in directions running from the front to the back of the keyboard. The operator repeatedly pivots his or her hands at the wrist joints side-to-side over the keyboard in order to select and actuate the individual keys.

Adverse physical conditions may arise in the operator's wrists, hands and fingers resulting from the kind of repetitive motions associated with typing on a conventional electronic keyboard, particularly for long periods on any given day or successive days. Such adverse conditions are compounded by the crude design of conventional electronic keyboards which encourages the side-to-side flexing of the operator's wrists, hands and fingers into particularly awkward and unnatural angles for prolonged periods of time. Typing injuries may fall into one of a few overlapping categories: repetitive stress disorder, repetitive motion injury, cumulative trauma disorder, and carpal tunnel syndrome. These conditions often require medical attention and, in severe cases, the worker may be unable to perform normal work functions. The cost in human suffering, and on-going medical expenses may be severe.

A recent search on the DIALOG (Trademark) patent database located approximately one hundred and twenty U.S. Patents granted since 1971 referring to "keyboard" and "carpal tunnel." They disclose various wrist/arm supports, keyboard geometries and positionable desktop surfaces for preventing injury to keyboard operators. In addition, several of the patents disclose method and apparatuses for detecting or treating carpal tunnel syndrome. A few of these patents disclose computer mouse constructions. While some of these patented devices have met with limited commercial success, to date none of them has been completely successful in preventing injury to the forearms, wrists and hands of an electronic keyboard operator.

Before the advent of modern electronic keyboards, it was relatively rare for full time operators of manual (non-electric) typewriters to experience injury to their forearms, wrists or hands, even if they typed forty hours per week. With the advent of modern electronic keyboards, particularly those associated with personal computers, a common design objective has been to provide minimal keystroke length and minimal keystroke resistance to make typing and data entry easier and faster. The primary constraint on minimizing both keystroke length and keyboard keystroke resistance was the fact that both had to be significant enough to prevent spurious key switch closures.

SUMMARY OF THE INVENTION

Accordingly, it is the object of the present invention to provide a method and apparatus of preventing injury to the forearms, wrists and hands of an electronic keyboard operator. According to my method, an electronic keyboard is provided with a keystroke resistance of at least one hundred gas and/or a keystroke length of at least ten millimeters. According to my invention, an electronic keyboard apparatus is provided having otherwise conventional construction but in which the springs are selected to provide a keystroke resistance of at least one hundred grams and/or the keystroke guide mechanisms are configured to provide a keystroke length of at least ten millimeters thereby forcing the hands to move over the keyboard with locked wrists in order to operate it.

DETAILED DESCRIPTION OF THE PREFERRED EMBODIMENTS

My research has indicated that almost all electronic computer keyboards have keys that can be depressed with less than one hundred grams of force and with less than ten millimeters of keystroke length. The problem with this type of "light touch" design is that an operator tends to angle his or her wrists back and forth as much as thirty degrees in reaching for various keys. If greater keystroke resistance and/or keystroke length were required in order to enter a particular letter, numeral, symbol or command, the operator would naturally tend to lock his or her wrists and move the hands over the keys, eliminating the severe wrist flexure. While this type of movement requires angling of the forearms by pivoting the shoulder, such angling is minimal, for example two to five degrees, and does not lead to injuries in the arms or shoulders. This may be due to the fact that the ball and socket construction of the shoulder joint is more conducive or natural to that type of side-to-side movement than the wrist joint.

Figure 1:
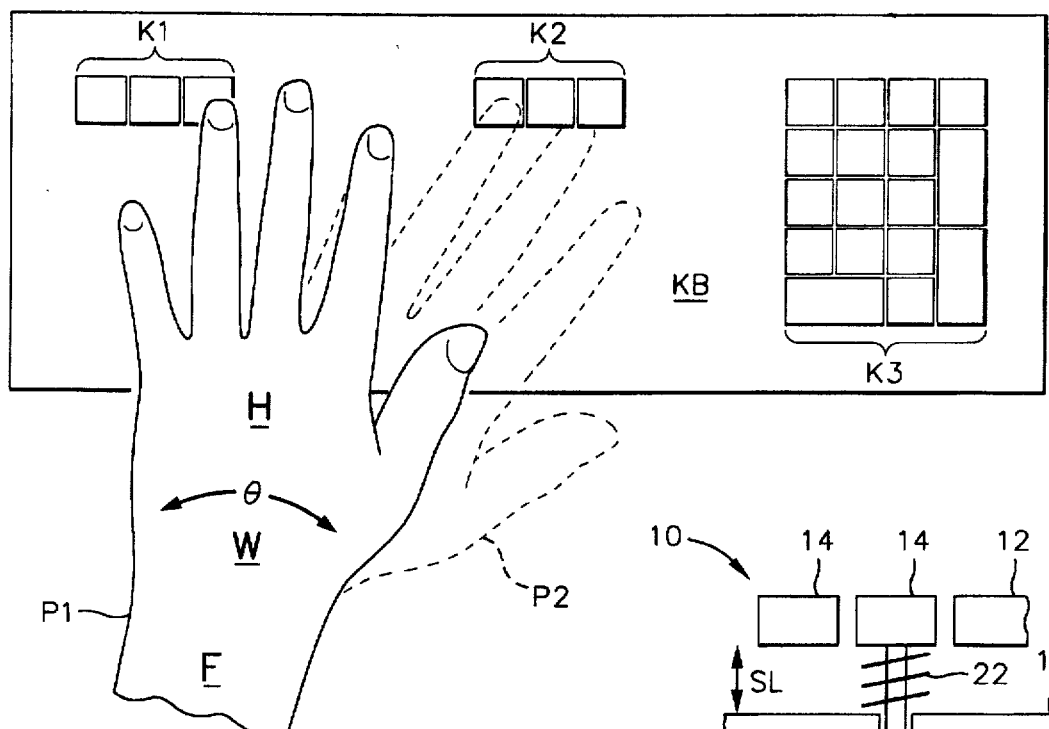
FIG. 1 is a simplified plan view illustrating an operator's left forearm, wrist and hand actuating a conventional electronic keyboard. The hand is shown in two different positions in sold lines and phantom lines.

Referring to FIG. 1, a conventional electronic keyboard KB is illustrated which includes a first plurality of keys, including keys K1 and K2, arranged in the standard QWERTY key format, and a second plurality of keys K3 arranged to the side normally including numeral keys and command keys. The conventional electronic keyboard KB also includes a space bar (not illustrated) adjacent the lower edge, function keys (not illustrated) adjacent the upper edge and other command keys (not illustrated). The electronic keyboard KB is constructed in well known fashion and includes a frame, a plurality of keys each having guide posts received in corresponding guide mechanisms mounted in the frame. Springs normally surround the posts and bias the keys upwardly. The lower ends of the posts are located above corresponding switches of a laminated membrane-type switch assembly. Typically the springs are selected so that the keystroke resistance force is approximately seventy grams. This is the average or approximate force required to be applied by the operator's fingers to depress a key sufficiently to cause the lower end of its associated post to close the corresponding switch and make electrical contact therein. Electrical signals are generated and recognized by the mother board of the personal computer as indicating that the operator has depressed a particular key at a particular moment. Normally the guide post associated with each key and the guide mechanisms associated with each guide post are configured so that the keystroke travels less than ten millimeters. Each key moves from its raised at rest position to its fully depressed position in which the lower end of the post actuates the associated switch.

Referring still to FIG. 1, the conventional electronic keyboard KB has such a light touch, i.e. requires so little force and/or so little keystroke closure distance, that it is only necessary for the operator's hand H to shift angularly between the position P1 shown in solid lines in FIG. 1 and the position P2 shown in phantom lines in FIG. 1. This causes the operator's wrist W to move through a substantial angle Θ which can be as much as thirty degrees. When the operator's hand moves between the positions P1 and P2, his or her forearm F remains more or less stationary. The type of hand and wrist movement illustrated in FIG. 1 can occur, for example, when the user first depresses the far right key of the set K1 which his or her ring finger and then moves to depress the far left key of the set K2 with his or her index finger. It is the back and forth repetitive movement of the operator's wrist W through the angle Θ which can lead to injury.

Figure 2:
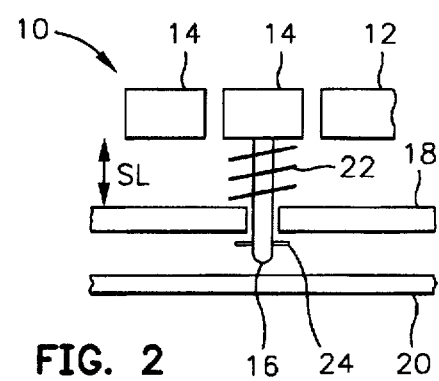
FIG. 2 is a diagrammatic vertical sectional view of an electronic keyboard apparatus constructed in accordance with my invention.

Referring to FIG. 2, in accordance with my invention, an electronic keyboard apparatus 10 includes a surrounding frame 12 having a plurality of keys 14. Each key 14 is connected to or formed with, such as by injection molding, a downwardly extending guide post 16. The electronic keyboard 10 further includes one or more vertically spaced guide plates 18 having holes for slidably receiving the guide post 16 of each of the keys 14. Together the guide posts 16 and guide plates 18 form guide mechanisms for permitting vertical reciprocal movement of the guide post 16. Beneath the lower end of the guide post 16 within the frame 12 of the electronic keyboard 10 is located a laminated membrane-type switch assembly 20 including a plurality of switches. Each of these switches is located directly beneath the curved lower end of a corresponding guide post 16. A coil spring 22 surrounds each guide post 16 of each key 14. Each spring 22 is compressed between its associated key 14 and the uppermost guide plate 18. A retainer 24 surrounds the lower end of the guide post 16 to prevent the key from falling out of the keyboard 10. It will thus be understood that each of the keys 14 is normally biased upwardly to its at rest position by its spring 22. The key 14 can be pushed downwardly by an operator's finger through a predetermined stroke length SL to cause the lower rounded end of the guide post 16 to engage and close the associated switch located in the laminated switch assembly 20.

In accordance with my invention, the compressive strength of the spring 22 is preferably selected to provide keystroke resistance of at least one hundred grams. The keystroke resistance is the amount of force that must be applied by an operator's finger in a downward direction to cause the lower end of the guide post 16 to close the associate switch on the switch assembly 20. Also, in accordance with my invention, the keystroke length SL is preferably at least ten millimeters. The keystroke length is defined as the distance that the key 14 and/or the post 16 must travel from its uppermost, at rest position, to its lowermost position in which the lower end of the guide post 16 engages and closes the switch on the switch assembly 20.

The effective upper limit for both the keystroke resistance and keystroke length would be those exhibited by conventional, non-electric typewriters, such as those sold for many years in the United States prior to 1960 under the Trademarks UNDERWOOD, SMITH CORONA and others.

Figure 3:
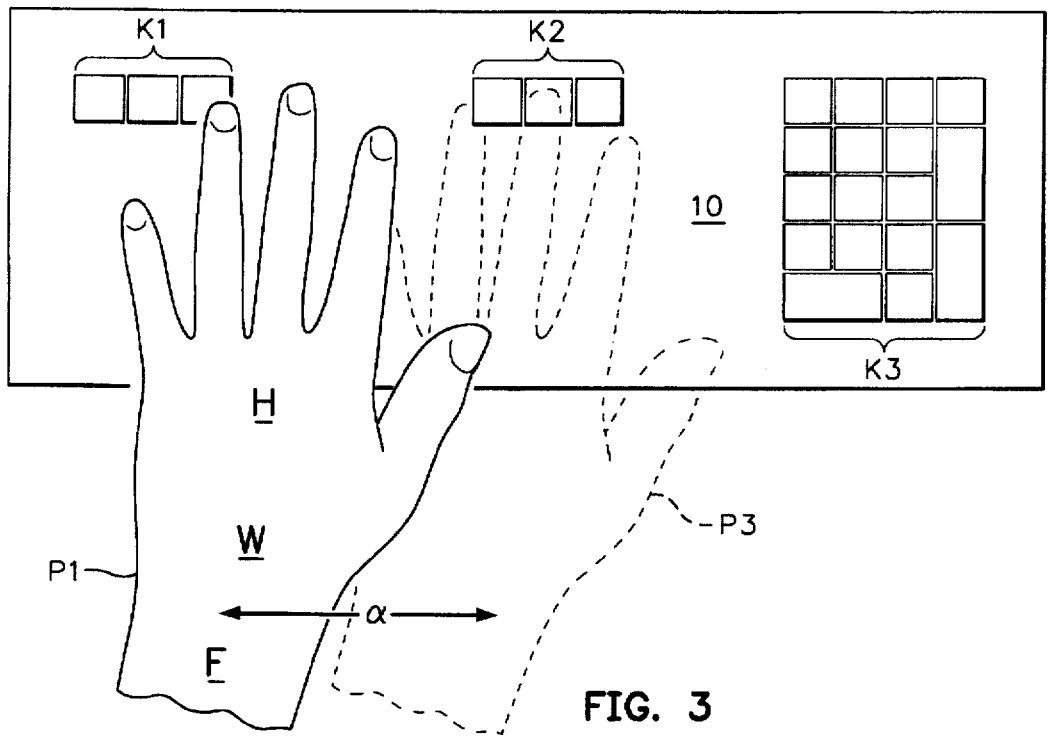
FIG. 3 is a simplified plan view similar to FIG. 1 illustrating an operator's left forearm, wrist and hand actuating an electronic keyboard apparatus constructed in accordance with the present invention. The hand, wrist and forearm are shown in a first position in solid lines and in a second position in phantom lines.

FIG. 3 illustrates the movement of the operator's hand H, wrist W and forearm F when he or she uses the electronic keyboard apparatus 10 constructed in accordance with my invention. More particularly, when the operator wishes to depress the far right key of the set K1 with his or her ring finger, and then depress one of the keys of the set K2 with his or her index finger, it is necessary for the operator to lock his or her wrist W. In FIG. 3, the initial position of the operator's hand H, wrist W and forearm F are shown in solid lines. When moving between the keys K1 and the keys K2, the operator's hand, wrist and forearm move from the position P1 shown in solid lines to the position P3 shown in phantom lines. The important thing to note in this operation is that the operator's wrist is locked and no longer swings through the angle Θ. Instead, the operator's forearm F moves through a much smaller angle α typically less than ten degrees. Because the operator has locked his or her wrist, the tendency to develop an injury from repetitive movements associated with the operation of the electronic keyboard apparatus 10 is greatly reduced compared to a conventional electronic keyboard apparatus KB (FIG. 1) of the prior art.

While I have described preferred embodiments of my method and apparatus for reducing injuries associated with electronic keyboard use, it should be apparent to those skilled in the art that my invention may be modified in both arrangement and detail. For example, benefits may be achieved by either increasing the keystroke resistance as indicated, increasing keystroke length as indicated, or by increasing both. Therefore, the protection afforded my invention should only be limited in accordance with the following claims.

I claim:

1. In an electronic computer keyboard having a frame, a plurality of keys, a switch assembly mounted in the frame, and a plurality of guide mechanisms for mounting each of the keys in a predetermined location above the switch assembly, the improvement comprising spring means associated with each of the guide mechanisms for providing a keystroke resistance of at least one hundred grams.

* * * * *